United States Patent Office 3,377,420
Patented Apr. 9, 1968

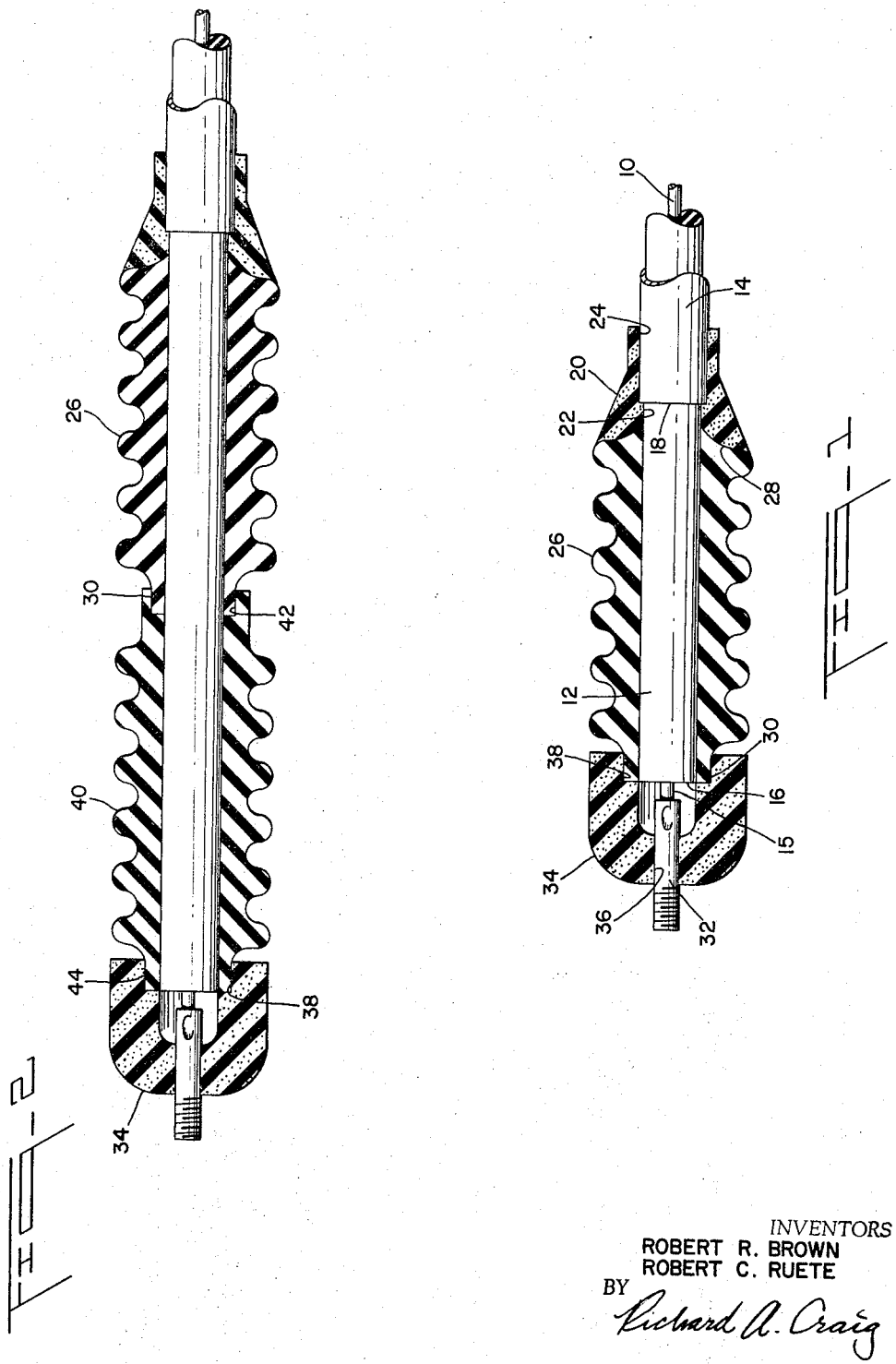

3,377,420
DEVICE FOR TERMINATING OUTDOOR ELECTRIC CABLES
Robert R. Brown, Bernardsville, and Robert C. Ruete, Long Valley, N.J., assignors to Elastic Stop Nut Corporation of America, Union, N.J., a corporation of New Jersey
Filed Apr. 16, 1965, Ser. No. 448,590
4 Claims. (Cl. 174—73)

ABSTRACT OF THE DISCLOSURE

An outdoor terminator for electric cables of the type having an electrical conductor, a covering of insulation over the conductor and a conductive ground shield jacket over the insulation and wherein a portion of the shield jacket is removed to expose an elongate portion of the insulation, the terminator being in the form of an elongate tube of insulating elastomeric material having an annularly corrugated exterior and a resiliently dilatable bore for receiving the exposed portion of the insulation in waterproof engagement. A stress relief cone of electrically conductive elastomeric material is molded integral with one end of the elongate tube and has a resiliently dilatable bore for receiving the shield jacket and the exposed insulation in waterproof engagement. A cap of electrically conductive elastomeric material may be fitted over an axially extending rim at the other end of the elongate tube in waterproof engagement and an electrical contact is fixed to the cable conductor and may pass through a resiliently dilatable bore in the cap such that the bore and the contact will be in waterproof engagement. A longer terminator may be established by placing more than one elongate tube in tandem along the exposed insulation with abutting tubes being engaged in waterproof relationship by corresponding rims and sockets.

---

This invention relates to outdoor terminators for electrical power cables having a central conductor, insulation surrounding the conductor, and a ground shield jacket surrounding the insulation.

In preparing to terminate such cable, a terminal portion of the jacket is removed to bare the insulation and form a shield rim, and a terminal portion of the bared insulation is removed to bare the central conductor. The shield rim is covered with a conductive stress relief cone, comprising a nose piece made of conductive rubber and used to establish a waterseal along the ground shield jacket and thus preventing moisture from entering the cable conductor.

The bared insulation is covered by a corrugated tube of insulation joining the stress relief cone, and an extension tube or extension tubes of the same material and corrugations may be applied in tandem in the same watertight relation.

The insulation portion of this invention has several uses. It serves primarily as an environmental protection for the cable insulation. Cable insulation is seldom capable of outdoor exposure where weather and sunlight could affect it and the combination of contaminants such as dirt or salt and the electrical surface stresses lead to a breakdown of the surface known as tracking. The insulation used in this invention is capable of resisting these types of destruction. Furthermore, because of the corrugated design, the physical distance between the live terminal and the ground shield can be shortened. This reduced size is often important, particularly when installations are made in confined areas.

It is therefore an important object of the present invention to construct a corrugated tube of insulation molded to a stress relief cone of a material capable of resisting environmental conditions. Another object is to provide a waterseal conductive cap to electrically screen the air in the joint. A further object is to provide a plurality of such corrugated insulation tubes which can be plugged together in tandem to extend the protection along the insulation to any desired length and thus assure that current will not flashover between the exposed conductor and the cable shield in even the most severe environmental exposure.

According to the present invention there is fitted over the elongated bared cable insulation in waterproof contact therewith, an elongated tube of track resistant elastomeric insulation having an annularly corrugated exterior. Preferably the rear end of the insulator tube abuts the stress relief cone surrounding the end rim of the ground shielded jacket. Preferably a cylindrical conductor tip is secured to the bared end of the cable conductor, and a waterproof cap has a central bore slid over the conductor tip in watertight contact, and also a rear socket receiving the front rim of the elongated tube, also in waterproof contact. In locations of rigorous conditions, an extension tube of the same material and corrugations is applied in tandem in the same watertight relation.

In the drawings:

FIGURE 1 is an axial section through a cable provided with a terminator according to the preferred embodiment of the present invention; and FIGURE 2 is a similar view showing a second corrugated insulated tube in tandem with the first as shown in FIGURE 1.

The electric power cable shown comprises an electrical conductor 10 of solid or stranded metal such as copper or aluminum, with insulation 12 covering the conductor 10, and a ground shield jacket 14 of conductive material surrounding the insulation 12. To prepare this cable for termination, the ground shield jacket is cut back to terminate in an annular rim 18, baring a relatively long length of the insulation 12, which in turn is cut off to terminate in an annular shoulder 16, leaving the conductor 10 with a bared end 15.

A stress relief cone 20 of conductive elastomeric material has central bore 22 tightly fitting over the bared cable insulation 12, and an enlargement 24 of said bore tightly receiving the shield jacket 14 and its rim 18.

Also sleeved onto the bared elongated cable insulation 12 in watertight contact therewith is an elongated tube 26 of track resistant elastomeric insulation having an annularly corrugated exterior. The tube 26 has an inner end 28 abutting the stress relief cone 20 in molded contact therewith. As shown in FIGURE 1, the tube 26 terminates in a rim 30 coextensive with the cable insulation shoulder 16.

A cylindrical conductor tip 32 is secured as by crimping to the bared end 15 of the cable conductor. A waterproof cap 34 made of conducting elastomeric material has a bore 36 receiving the tip 32 in waterproof contact. The cap 34 also has a rear socket 38 receiving the tube rim 30 in watertight relation. This cap electrically screens the air in the joint, takes the stress out of the air in the nose area, and retains it in unstressed relation.

As shown in FIGURE 2, a second or extension tube 40 is sleeved onto the bared elongated cable insulation in tandem with the first tube 26. The extension tube 40 is of the same track resistant elastomeric insulation and has an annularly corrugated exterior the same as tube 26. The extension tube 40 has a rear socket 42 receiving the rim 30 of the first tube 26, and a front rim 44 fitting into the socket 38 in the cap 34.

If necessary, more extension tubes could be applied in tandem to greatly increase the flashover resistance of the resultant termination.

What is claimed is:

1. Outdoor terminator for a cable comprising an electrical conductor, a covering of insulation over said conductor, and a conductive ground shield jacket over said insulation, a terminal portion of said jacket being removed to bare an elongated portion of said insulation; said terminator comprising an elongated tube of track resistant elastomeric insulating material having an annularly corrugated exterior, said elongated tube having a resiliently dilatable bore for receiving said bared elongated portion of said cable insulation therein in waterproof contact therewith, and a waterproof cap of electrically conductive elastomeric material having a resiliently dilatable socket fitting over the outer end of said annularly corrugated tube in waterproof contact therewith.

2. Outdoor terminator for a cable comprising an electrical conductor, insulation covering said conductor, and a conductive ground shield jacket over said insulation, a terminal portion of said jacket being removed to bare an elongated portion of said cable insulation; said terminator comprising an elongated tube of track resistant elastomeric insulating material having an annularly corrugated exterior, said elongated tube having a resiliently dilatable bore for receiving said bared elongated portion of said cable insulation in waterproof contact, in combination with a cylindrical conductor tip to be secured to said cable conductor end, and an annular cap of electrically conductive elastomeric material having a resiliently dilatable central bore receiving said cylindrical conductor tip, and a resiliently dilatable socket receiving the outer end of said elongated corrugated insulator tube, both in waterproof contact.

3. Outdoor terminator for a cable comprising a conductor, a covering of insulation over said conductor, and a conductive shielded jacket over said insulation, said jacket being cut back to bare an elongated portion of said insulation, said terminator comprising a stress relief cone of electrically conductive elastomeric material having a resiliently dilatable bore for receiving said bared cable insulation and an enlarged bore for receiving said jacket, the smaller bore end terminating in an annular convex surface of revolution, an elongated tube of track resistant elastomeric insulating material having an annularly corrugated exterior and a resiliently dilatable bore for receiving the elongated portion of said insulation beyond said stress relief cone and having a concave surface of revolution fitting the convex surface of said stress relief cone, and an extension tube of elastomeric insulating material having an annularly corrugated exterior and a resiliently dilatable bore for fitting over said bared insulation in tandem with said first tube, said tubes having confronting ends interfitting in waterproof contact and a cap of electrically conductive elastomeric material fitting over the outer end of said extension tube in waterproof contact therewith.

4. Termination means for a cable comprising an electrical conductor, a covering of insulation over said conductor, and a conductive ground shield jacket over said insulation, a terminal portion of said jacket being removed to bare an elongated portion of said insulation; said termination means including an elongated tube of insulating elastomeric material having an annularly corrugated exterior and a resiliently dilatable bore for receiving said bared elongated portion of said cable insulation therein in waterproof contact, said tube having an axially extending rim of predetermined outside diameter at one end and a stress relief cone of electrically conductive elastomeric material molded to the other end of said elongated tube, said stress relief cone having a resiliently dilatable bore including a first portion for receiving said bared elongated portion of said cable insulation in waterproof contact and a second portion for receiving said jacket in waterproof contact.

References Cited

UNITED STATES PATENTS

| | | | |
|---|---|---|---|
| 3,047,025 | 7/1962 | Davis. | |
| 3,294,122 | 12/1966 | Sharp | 138—110 |
| 3,269,076 | 1/1942 | Boll. | |
| 3,257,501 | 6/1966 | Sauer | 174—143 |
| 3,243,756 | 3/1966 | Ruete et al. | 174—73 |
| 2,323,399 | 7/1943 | Jacobi. | |
| 2,789,154 | 4/1957 | Peterson | 174—127 X |

FOREIGN PATENTS

| | | |
|---|---|---|
| 70,515 | 12/1958 | France. |
| 107,922 | 7/1939 | Australia. |
| 728,100 | 4/1955 | Great Britain. |
| 72,518 | 11/1959 | France. |

LARAMIE E. ASKIN, *Primary Examiner.*